United States Patent [19]

Brisson

[11] Patent Number: 5,704,409
[45] Date of Patent: Jan. 6, 1998

[54] FLEXIBLE MOUNTING SYSTEM FOR LOG DEBARKING EQUIPMENT

[75] Inventor: Maurice Brisson, Laval, Canada

[73] Assignee: Denis Comact Chicoutimi Inc., Chicoutimi, Canada

[21] Appl. No.: 710,678

[22] Filed: Sep. 23, 1996

[51] Int. Cl.⁶ ................................................. B27L 1/00
[52] U.S. Cl. ........................ 144/208.8; 144/208.1; 144/341
[58] Field of Search ................ 144/24.13, 208.1, 144/208.8, 343, 340, 341

[56] References Cited

U.S. PATENT DOCUMENTS 3,913,644  10/1975  Braun ......................... 144/208.8
4,036,270   7/1977  Bright ........................ 144/208.8

Primary Examiner—W. Donald Bray
Attorney, Agent, or Firm—Merchant, Gould, Smith, Edell, Welter & Schmidt, P.A.

[57] ABSTRACT

A flexible mounting system principally developped for ring-type log debarkers comprises a combination of freely oscillating supporting links and weight compensating pneumatic devices, arranged in such a way as to allow the working tool assembly of the debarker to move in any direction in response to external forces exerted upon it by the longitudinal feed motion or the shape irregularities of the log.

16 Claims, 6 Drawing Sheets

FLEXIBLE MOUNTING SYSTEM FOR LOG DEBARKING EQUIPMENT

FIELD OF THE INVENTION

The present invention relates to a flexible mounting system for log debarking equipment including ring-type log debarkers and/or log guiding units, allowing said equipment to move individually in any direction in response to external forces exerted by the longitudinal feed motion or the shape irregularities of the log being processed therethrough.

BACKGROUND OF THE INVENTION

Log debarkers are known in the forest product industries as the type of machine most severely stressed mechanically among all of the equipment used for any manufacturing process, whether in pulp and paper or in lumber production.

Rotating ring-type debarkers are normally stationary units solidly anchored to massive steel or concrete supporting structures. From this free-standing position, they are required to absorb repeated impact loads from logs or tree stems propelled in their direction by high speed longitudinal feed conveyors.

The leading end of each incoming log first strikes the infeed roll system attached to the debarking unit and normally kept in the closed position under pneumatic pressure when not in contact with a log. A second shock load immediately follows when the log reaches the rotating ring carrying debarking tools which are also kept closed under elastic pressure in the gaps between logs. Each log to be processed therefore delivers two major blows to the debarking unit before gaining access to the actual processing section of the machine. Depending on the size of the debarker, logs or full tree stems exceeding one ton in weight may be processed. In smaller models, where log weight is limited to a few hundred pounds, the feed frequency can reach up to 25 pieces per minute with an impacting speed up to 5 feet per second.

Following log entry into the working section, the debarking process involves scraping the bark from its surface by means of elastically pressured tools pivoted towards the center of a rotating ring through which passes the work piece. The latter is normally held centered at two points along its feed path by stationary centering rolls located in the front and back of the debarking unit so that any curvature of the log between these centering rolls forces the tools in the rotating ring to contact the log periphery in an off-center position with regard to their own rotational center. This condition causes a difference in tool pressure on the diametrically opposite portions of the log surface in the sector where the curvature occurs, resulting in incomplete debarking on the light pressure side and excessive wood fiber removal on the opposite side. In extreme cases, the log can be fractured by such uneven pressures generated by off-centering of the log in the rotating tool ring.

Besides reducing debarking quality, this condition causes considerable additional mechanical stresses in all the debarking rotor components. For this reason, rotating ring debarkers are known to have the highest maintenance costs and downtime hours of all production machines in a lumber mill, where this type of machine is mostly used. In an effort to reduce such high maintenance costs and production losses, many present-day debarker manufacturers have increased the bulk and strength of the mechanical and structural components of their machines, even in models limited to smaller diameter wood.

This has resulted, among other things, in the use of heavier debarking tools to process logs of ever diminishing size, a common occurrence throughout the northern part of the American continent, as well as in Scandinavia and Finland. Heavier tools have greater inertial properties which restrict their ability to maintain contact with abruptly changing contours of the log periphery. Greater centrifugal forces generated by the increased tool mass also tend to pull these heavier tools away from the log surface, so that higher closing pressures must be applied to them to reduce the tendency to jump over depressed areas of the log, such as found inside seams and behind stumps left by delimbing. This higher pressure causes an increase in wood fiber pull-out from protruding parts of the log and those areas of the surface furthest away from the tool rotational center, due to sweep and bends along the log length.

The detrimental effect of log off-centering in the tool ring is further aggravated by another recent trend in debarking technology which consists in utilizing simultaneously two sets of rotating tools which are, in most cases, mounted in individual rotors placed one behind the other on the same feed axis, with space in between for bark ejection and a set of intermediate feed rolls. This arrangement inevitably increases the distance between the stationary front and rear centering rolls, therefore producing a greater deviation of the curved log mean axis with regard to the center of each tool ring and, therefore, a greater tool pressure difference on the log surface.

OBJECTS AND STATEMENT OF THE INVENTION

It is an object of the present invention to directly address the basic causes of mechanical breakage through material fatigue induced by repeated impact from incoming logs and of excessive wood damage due to log off-centering in the rotational plane of the tools. This is achieved principally by providing the debarking units in a debarking assembly with sufficient freedom of movement, first, to reduce impact loads at log entry and, second, to minimize log offset during its passage through the rotational plane of the debarking tools.

The present invention therefore relates to a flexible mounting system for log debarking equipment such as ring-type log debarking units and/or log guiding units associated with said log debarking units, each unit having a separate frame structure; the system comprises:
support means mounted to a stationary base; and
oscillating means connecting the support means to the frame structure allowing the frame structure to float freely with respect to the stationary base upon impact from incoming logs and/or as a result of off-centering pressures generated by logs being processed.

In one preferred form of the invention, the purpose of the mounting system is accomplished by:
a) supporting one side of the debarking equipment on freely oscillating means allowing movement in any direction along roughly horizontal paths; and
b) balancing the major part of the residual weight of the debarking equipment by applying a stable elastic supporting pressure on the opposite side of it.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

It must first be stated that the present invention will be described mainly with reference to FIGS. 1 to 5 in connection with a ring-type debarker 10 which is found worldwide and is still being fabricated by many manufacturers. The use of this particular model of ring debarker to illustrate the application of the present invention is non-limiting insofar as any other models of ring debarker are concerned, such as the one schematically illustrated in FIGS. 6 and 7.

Figure 1:
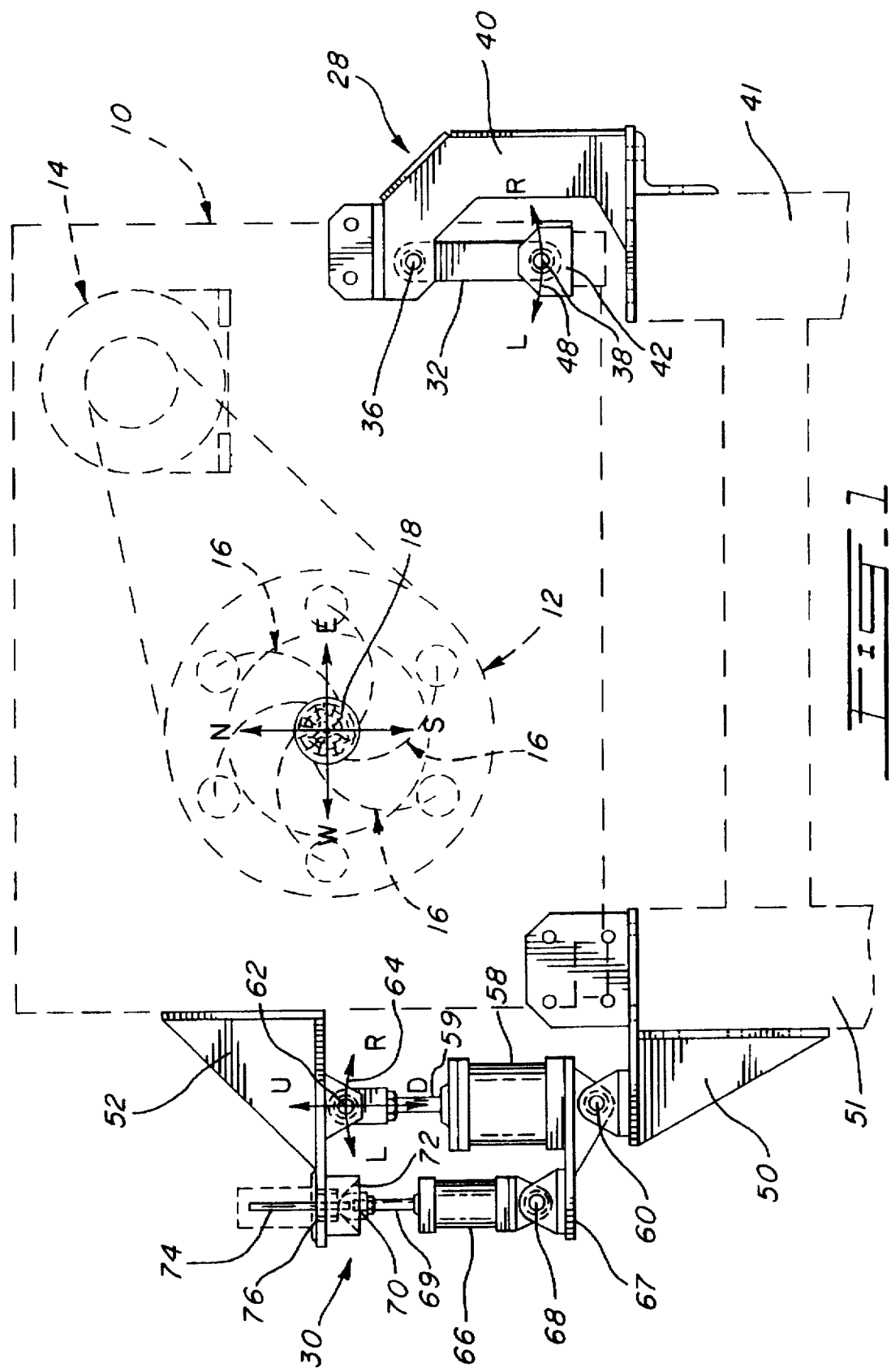
FIG. 1 is a front elevation view of a flexible mounting system made in accordance with the present invention for a typical debarker, schematically represented.
Figure 2:
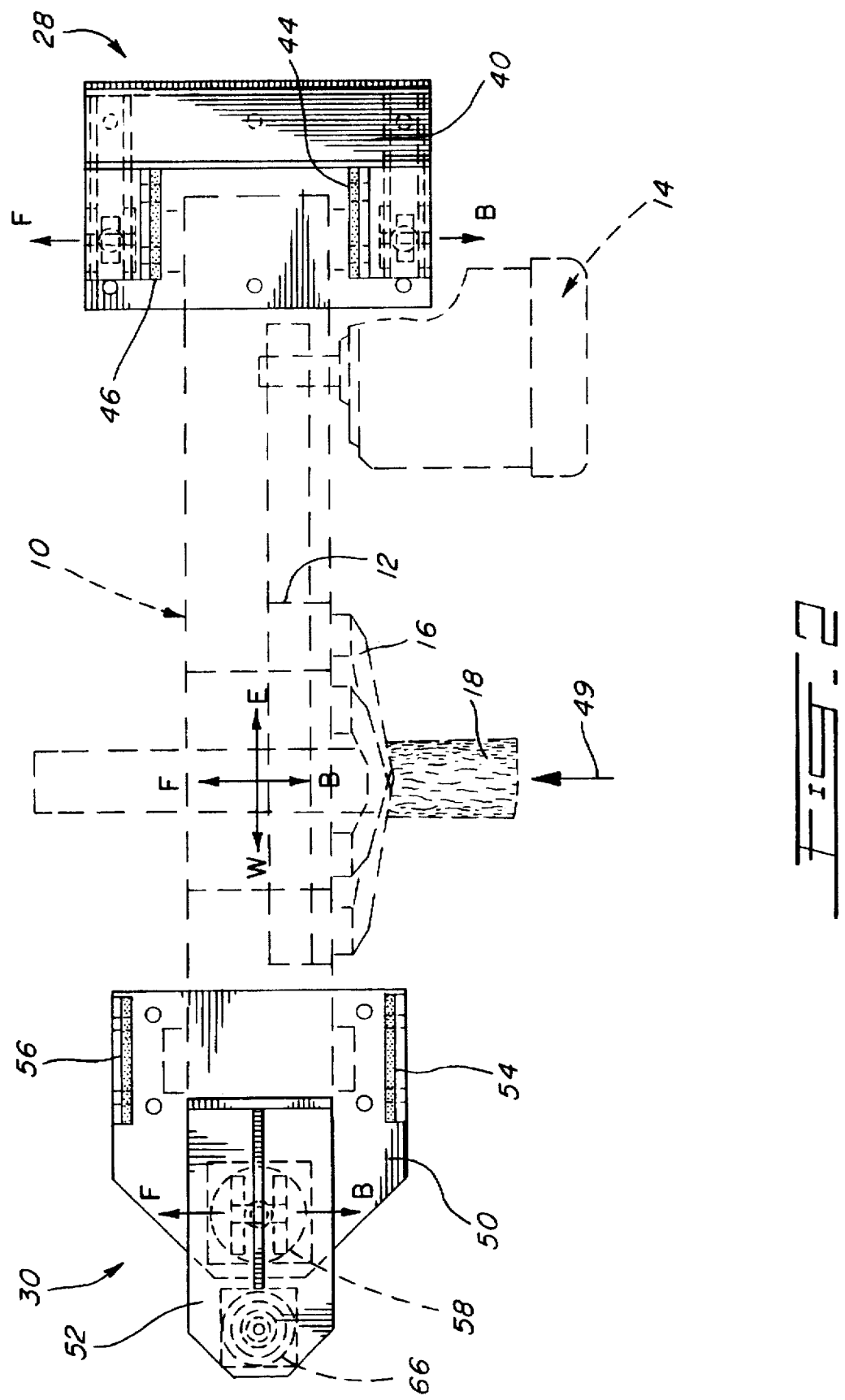
FIG. 2 is a top plan view of the flexible mounting system of FIG. 1.
Figure 3:
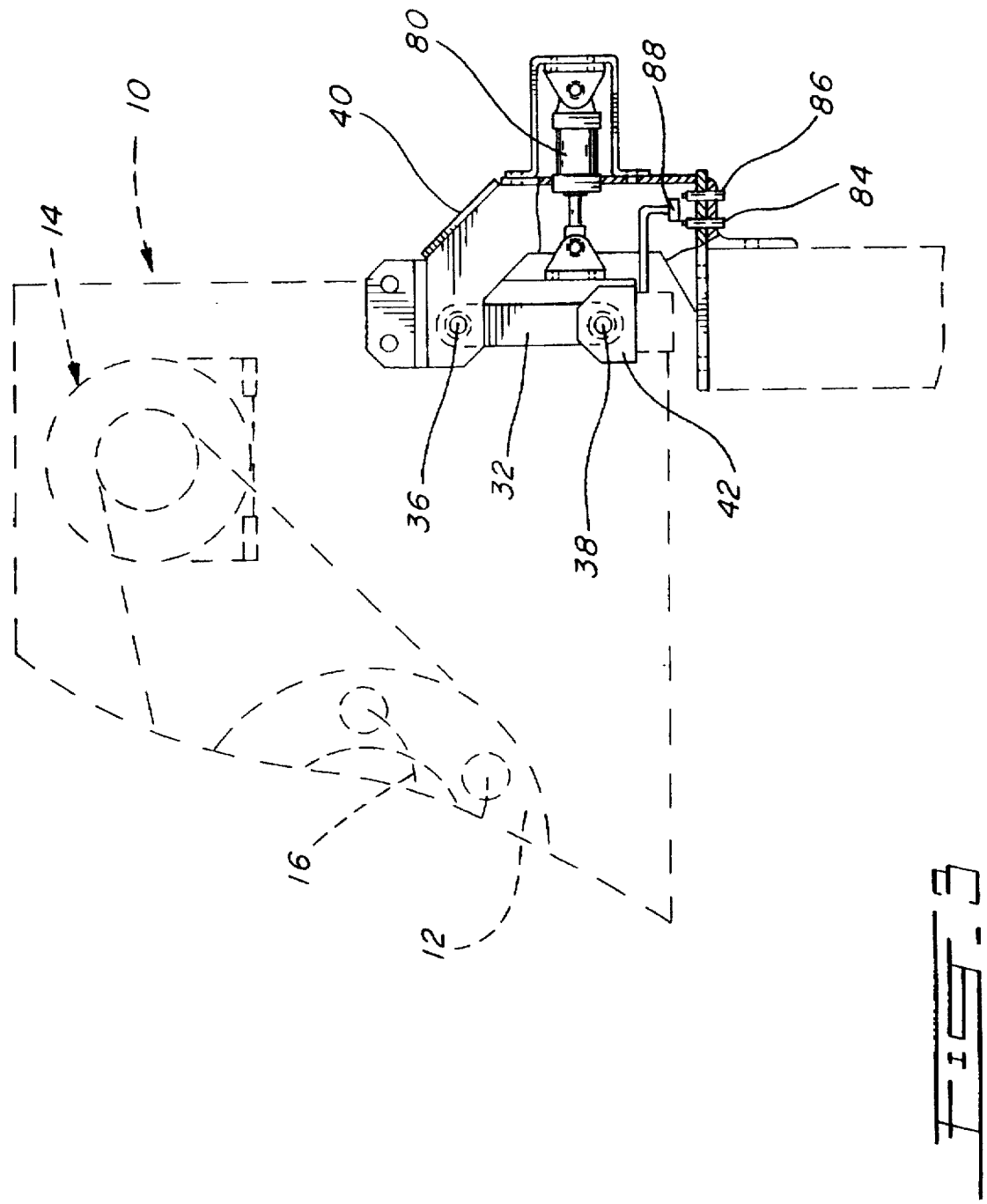
FIG. 3 is a, partly cross-sectional, elevation view showing the details of an off-centering assist used with the present invention.
Figure 5:
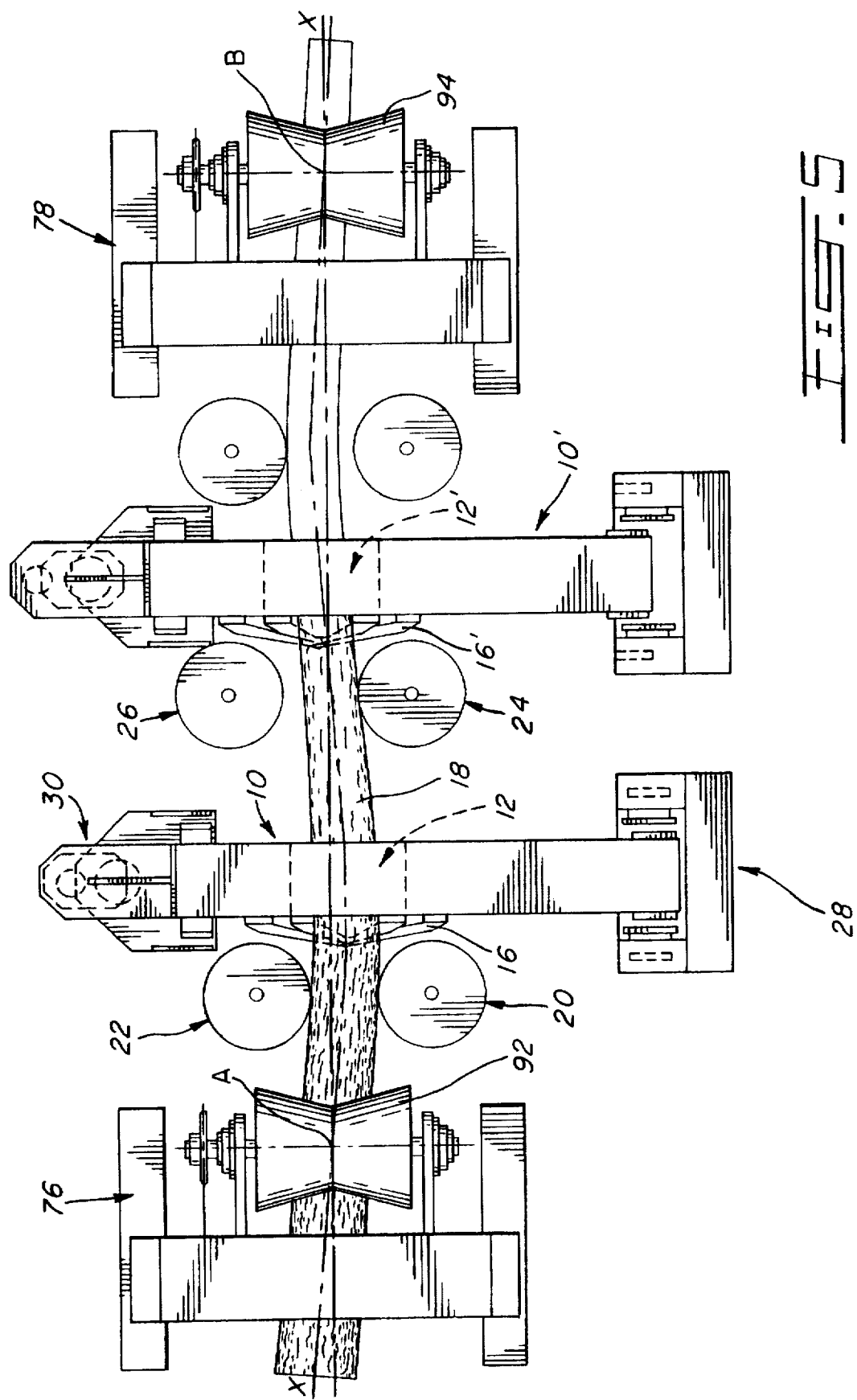
FIG. 5 is a top plan view of a flexible mounting system made in accordance with the present invention and applied to a double rotor unit shown processing a crooked log.

Referring to FIGS. 1 and 2, the debarker 10 includes, as main working components, a rotor 12 powered by a motor 14 and carrying elastically pressured debarking tools 16 which contact the surface of a log 18 as it is longitudinally fed through the center of the rotor by means of feed rollers 20, 22, 24 and 26 attached to the frame of debarkers 10 and 10' as shown in FIGS. 5.

The flexible mounting system of the invention includes two basic equipment groups 28 and 30 supporting the weight of the debarker on either side of it, each group extending to the front and back of it.

Concerning group 28, the lower right-hand side corner of the debarker 10 is suspended by a pair of freely oscillating rigid links 32, each attached through spherical joints 36 and 38, at the top, to a pedestal 40 affixed to a stationary base 41 and, at the bottom, to a bracket 42 which is attached to the foot of the debarker.

Figure 6:
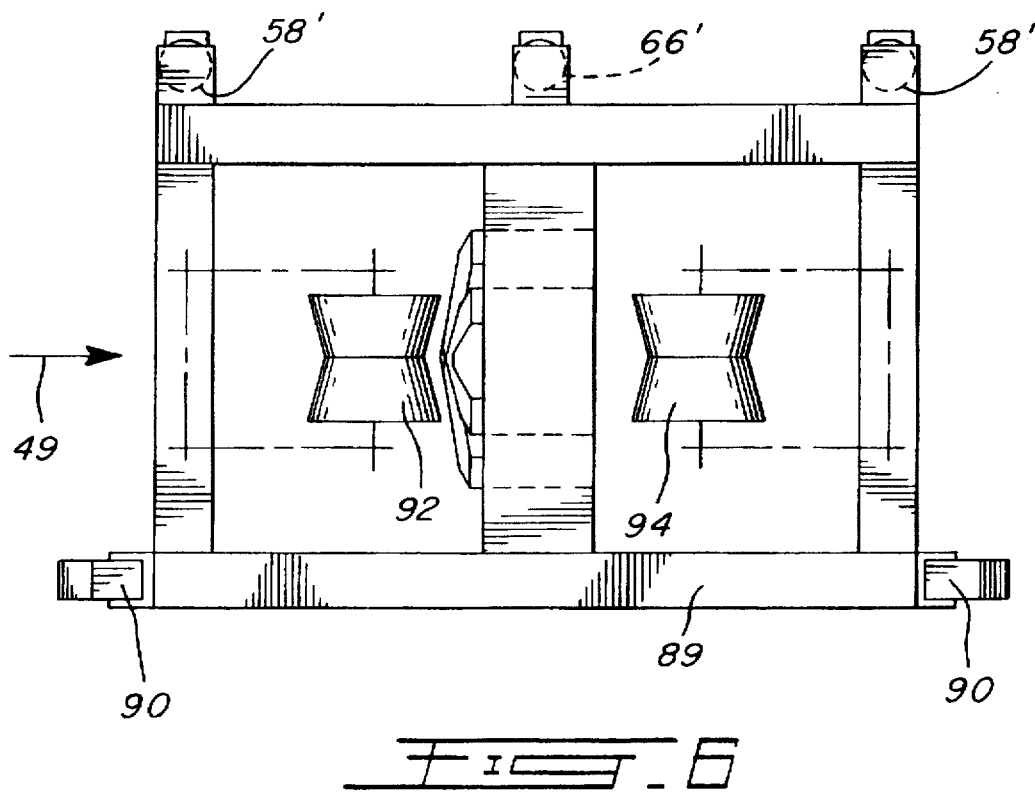
FIG. 6 is a top view showing another embodiment of the flexible mounting system of the present invention.
Figure 7:
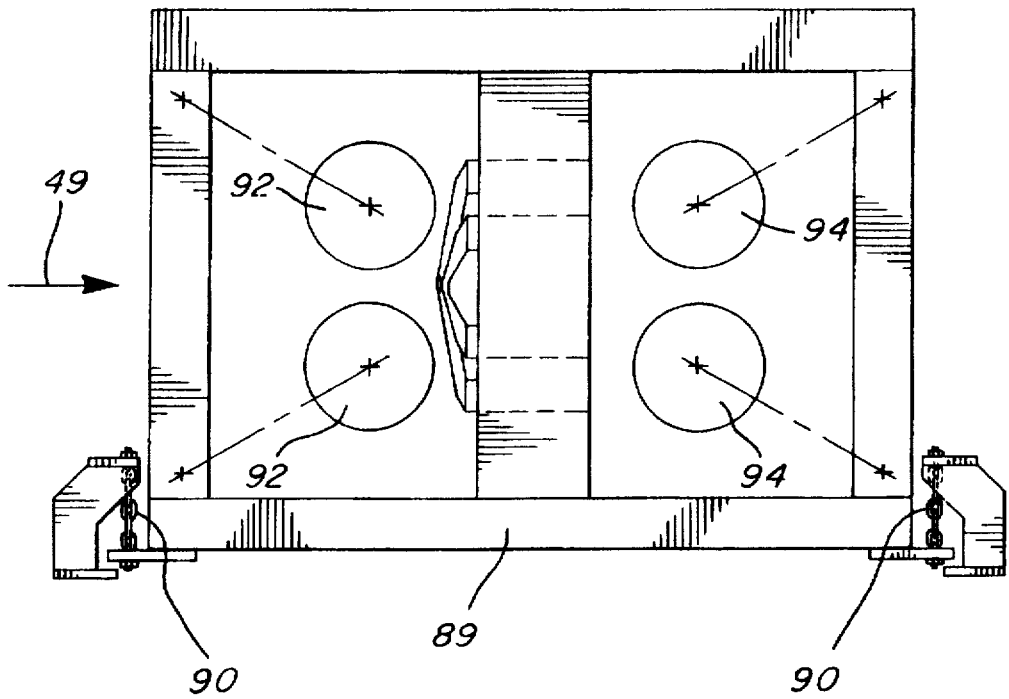
FIG. 7 is an elevation view of the embodiment illustrated in FIG. 6.

It is to be noted that for a short base debarker, such as the one shown in FIGS. 1 and 2, it is necessary to use vertically restrictive, or rigid type, suspension links 32 to insure the vertical stability of the debarker structure. This is not required in the case of long frame debarkers, such as shown in FIGS. 6 and 7, where extended spacing of the supporting points insures such vertical stability even if flexible suspension members such as 90 are used.

Pedestal 40, in FIG. 2, is shown extending in two identical centrally joined portions located one in front and the other in back of debarker 10. The inner face of each said portion of the pedestal is provided with a rub plate 44, 46, which serves to limit movement of the debarker in the direction of arrows F and B. It can be seen that the previously described components of equipment group 28 allow freedom of movement for the debarker 10 along an arc 48, in both directions indicated as L and R in FIG. 1. Further, the use of spherical joints 36 and 38 (or equivalent pivoting means) at both extremities of links 32, also permits movement of the right-hand side of the debarker in either of the directions indicated by arrows F and B, (FIG. 2) along the longitudinal feed line 49 of the log.

Equipment group 30 is provided on the opposite side of the debarker between a lower supporting bracket 50 fixed to a stationary base 51 and an upper bracket 52 which is attached to the sidewall of debarker 10. The fixed base 50 carries vertical rub plates 54 and 56, in front and back of the debarker, in order to limit movement of the left-hand side in directions of arrows F and B in the same manner as provided in the equipment group 28 for the right-hand side of the debarker.

The working assembly of equipment group 30 comprises a vertically mounted pneumatic cylinder 58 of suitable diameter to provide, at a controlled level of air pressure, thrust equivalent to some 90% of the weight component of the debarker as perceived at the axis of said cylinder. Sufficient stroke length is also provided in the cylinder to allow the desired movement of the center of rotor 12 of debarker 10, up and down as per arrows N and S in FIG. 1, from a medium level position. Cylinder 58 is attached to both the supporting bracket 50 and the debarker wall bracket 52, through spherical joints 60 and 62 (or similar pivotal means) which allow angular orientation in any direction from its mounting points.

Thus, movement of the entire mass of debarker 10 is allowed in all directions horizontally, the only restraint imposed in its trajectory being the arc 48 described by the lower mounting points 38 of links 32 in equipment group 28. The pneumatic system of equipment group 30, besides conforming fully to the transversal and longitudinal mobility of the link suspension in equipment group 28, is also devised as mentioned above to add vertical mobility to the debarker rotor 12, through extension and recession of the piston rod 59 in cylinder 58.

Another permissible mode of the invention consists of an inversion in the manner of mounting the supporting means in equipment groups 28 and 30, so that links 32 would function in compression while pneumatic cylinder 58 would act in tension as a suspension member.

As a consequence of the overall system capabilities considered so far, tool carrying rotor 12 of debarker 10 can be displaced by any external force in any direction, horizontally or vertically. In other words, mobility in all directions, along straight or curved lines, becomes by reasons of the present invention a functional characteristic of the rotor in any debarker, thus allowing best possible centering of its debarking tool assembly according to varying positions of the log section in contact with the debarking tools at any instant of the feedthrough process, besides the additional capability of cushioning log entry and feed reversal shocks on all mechanical components.

A particular requirement in this rotor mobility concept is that the supporting system used should be auto-centering, in such a way as to return the rotor to its normal position, both horizontally and vertically, in the time interval between exit and entry of successive logs. Referring to FIG. 1, the horizontal re-centering force is provided by the short tension links 32 having a deeper concave trajectory 48 and therefore a larger centering force than the off centering force of the flatter arc 64 resulting from the pivoting action of supporting cylinder 58, assuming in the present example as in most cases that the weight distribution between the two points of support is approximately equal.

Vertical centering of the rotor is provided by a levelling pneumatic cylinder 66 which, in its fully extended mode, acts as a rest to maintain the normal vertical position of the rotor, when no external force is applied. Levelling cylinder 66 is also pivotally mounted through a spherical joint 68, preferably on a common mounting base 67 with weight balancing cylinder 58. The rod 69 of cylinder 66 carries a hemispherical rest piece 70 which fits into a conical seat 72 attached to the underside of the debarker wall bracket 52. A guide rod 74 is affixed to the top of the hemispherical rest 70 and protrudes through a circular opening 76 at the base of the conical seat 72, the purpose of this arrangement being to keep the rest piece aligned with any position of the conical seat 72 while debarker 10 may be undergoing any combination of horizontal or vertical motions.

The underlying condition in this two-cylinder arrangement is, first, that a steadily controlled pressure should be maintained in weight balancing cylinder 58 and be so adjusted as to carry some 90% of the weight component resting upon it, thus insuring that, during free periods, the mass of debarker 10 will tend to tilt downward from its pivoting point 38. On the other hand, levelling cylinder 66, also under controlled pressure, is positioned when fully extended, to cause contact of rest piece 70 with the interior wall of conical seat 72 at a level which determines the vertically centered position of the debarker rotor 12. At this point, the combined thrust of both cylinders 58 and 66, at their individually programmed pressure, will be just sufficient to maintain such a level position. Given this equilibrium condition, it follows that even a minimal force exerted vertically will cause the rotor to move up or down depending upon the direction of such external force.

The overall effect of the combined mechanical and pneumatic supporting means just described is to allow free movement of a debarker rotor 12 in all directions along any radius from the center of a sphere, comprising all possible deviations from straight line motion, under any external force such as may be generated by the passage of crooked or deformed logs through the rotor, while the logs are individually held centered in front and back of the debarker by stationary elements of the infeed and outfeed systems external to the debarker, such as 76 and 78 in FIG. 5.

It should be noted at this point that if one is willing to relinquish the advantages of vertical mobility which is part of the overall characteristics of the complete system proposed in this invention, then the mechanical arrangement of equipment group 28 could be used alone, on both sides of a debarker, to provide lateral motion only. The motive behind such a tactic would be to secure half the benefits of the full invention for less than half of the acquisition cost of the complete system.

Referring again to the transversal centering force caused by the concave arc trajectory 48 (FIG. 1) produced by suspension links 32, it has been calculated that the off-centering force to be generated by any crooked or mis-shapened log must increase many folds in order to displace the mass of the debarker from its lowest position upwards to the top of the arc. It is to be noted that the centering force exerted by equipment group 28 is partly countered by the interaction of equipment group 30 which generates a flatter convex trajectory in the transversal motion of the debarker. Therefore, under debarking conditions where maximum lateral motion of the rotor is sought, an auxiliary attachment such as the one shown in FIG. 3 may be useful. This optional system is capable of applying, through a pneumatic cylinder 80, a controlled horizontal off-centering force to the rotor, in either direction, once a determined position of the debarker along its transversal trajectory has been reached in the arc 48 imposed by links 32, where the mass gravity component would tend to limit the outer movement flexibility deemed necessary for the particular debarking conditions. Automatic control of cylinder 80 is provided by a four-way directional valve 82 (FIG. 4) which is solenoid actuated from signals emitted by proximity switches 84 and 86 upon approach by follower 88.

Although the preferred application of the invention relates to a common type of debarker of worldwide use having a general configuration such as shown in FIGS. 1 and 2, other existing debarking units of greatly diverging proportions, such as shown in FIGS. 6 and 7, can be accommodated by a similar system adapted to the dimensions and weight of such a unit. In the case of machines having a longer mounting base 89 in the longitudinal feed direction, the suspension links may be spaced out relatively to the total frame length, which could allow the use of simpler flexible elements 90 instead of the rigid type links 32 shown in FIG. 1, without compromising the vertical stability of the debarker rotor. In such longer based machines, two or more weight balancing cylinders 58' would be installed on the side opposite from the pivoted link suspension, along with one height levelling cylinder 66'.

One alternative in the application of the invention would consist in maintaining the debarker in a stationary position while allowing the log infeed and outfeed guiding devices (such as 76 and 78 shown in FIG. 5) to move freely with any deviation in the log natural axis, by means of the same pivoted supporting systems described and illustrated in FIGS. 1 and 2. As an extension of the mobility concept of this invention, it might be considered to utilize the pivoted mounting systems to support both the debarker(s) and the adjacent infeed and outfeed log guiding devices (such as 76 and 78), thus forming a processing line having a flexible axis which could conform to any sinuosity of the log passing through it.

The main reason why mobility of external log guiding systems is not included in the preferred embodiment of the invention, is that centering the log within the debarker rotor is most directly and effectively accomplished by holding the log at stationary centering points such as "A" and "B", (FIG. 5) on guide rolls 92 and 94 and displacing the debarker rotors 12 and 12' to follow the natural axis of the log as it passes through.

Besides being adaptable to all models of single ring-type debarkers working individually, as well as to their external log guiding systems, the concept of this invention also finds a primary function in so-called twin-rotor debarking systems which are gaining favour in the forest product industry for their superior debarking efficiency at the highest feed rates. FIG. 5 illustrates such an application where two debarkers 10 and 10' in line are flexibly and individually mounted, using the arrangement of equipment groups 28 and 30 according to the present invention as described in relation to FIGS. 1 and 2, so that each of the two rotors 12 and 12' are allowed to follow the log curvature independently one from the other. Axis "X"—"X" identifies a straight line drawn through two stationary centering points "A" and "B" provided by two pairs of superimposed bi-conical rolls 92 and 94 which are elastically pressured and positively auto centered in the vertical direction. It can be seen in FIG. 5 that the natural axis of the log may diverge from axis "X"—"X" in the horizontal plane; it must logically be assumed that similar variations also occur in the vertical plane. Since guide rolls 92 and 94 tend to center the log rigidly in perpendicular planes at points "A" and "B", it follows that any curvature of the log axis must cause portions of it to become off-centered in any plane within the debarking rotors unless these rotors have the instant capability to re-center themselves in all directions to conform with the instant position of the log axis as it is fed through the debarkers. This is what is achieved by the present invention in any application relating to either "single" or "twin" debarking rotor arrangement, by allowing simultaneous horizontal and vertical displacements of the rotor in response to any off-centering force exerted by the log.

Figure 4:
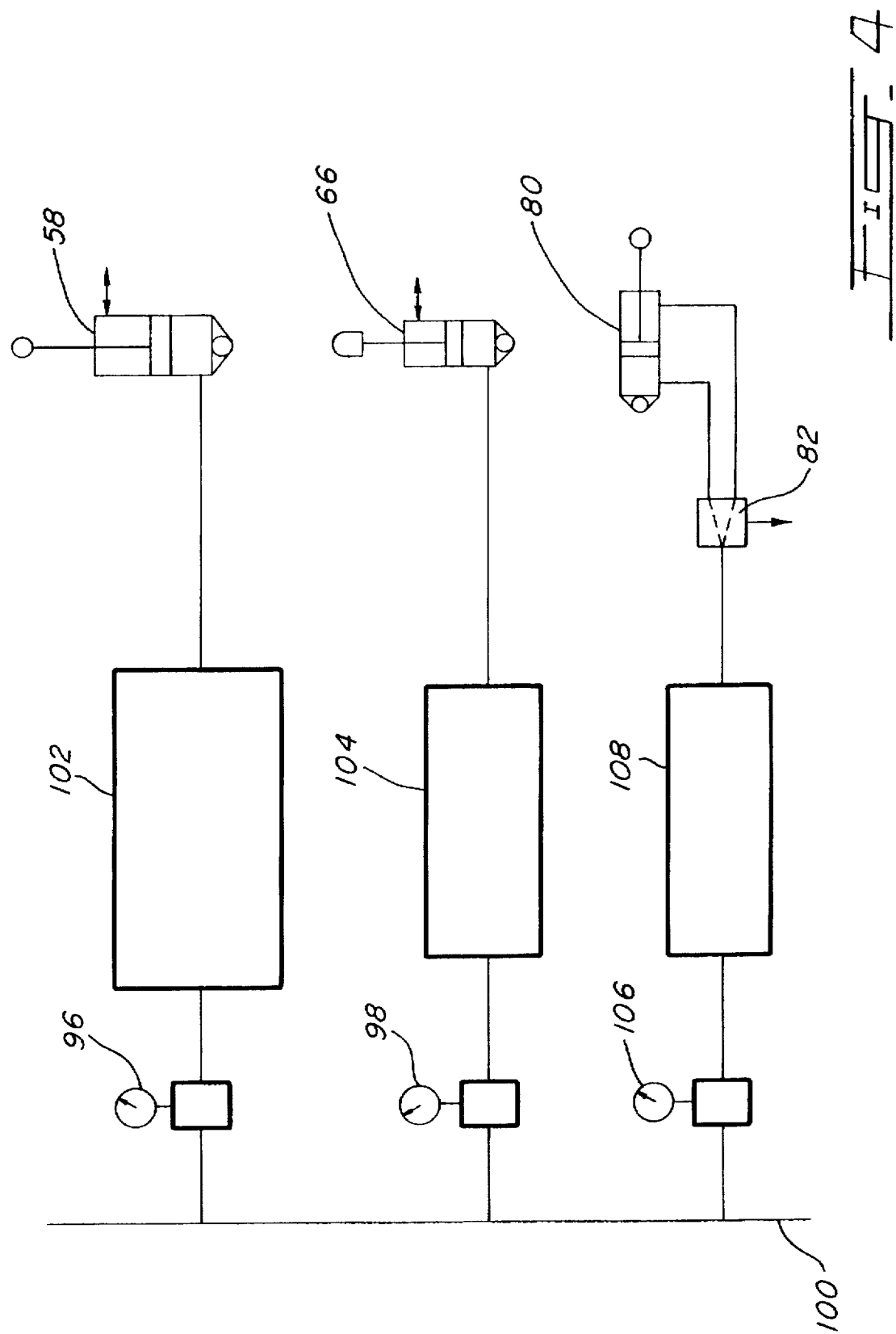
FIG. 4 is a diagram showing a pneumatic circuitry to provide stable flexible pressure to the mounting system.

In order to insure maximum liveliness in the vertical motion, pressures in cylinders 58 and 66 must be kept constant during the rapid fluctuations in the position of the piston within each cylinder. This operating condition requires means of air pressure control and volumetric surge capacity, such as schematically shown in FIG. 4. More specifically, pressure control valves 96 and 98, connected to compressed air service line 100, maintain a constant pressure in air receivers 102 and 104 which in turn provide stable operating conditions for weight balancing cylinder 58 and vertical levelling cylinder 66. A somewhat similar circuit also including a pressure control valve 106 and air receiver 108, plus a solenoid actuated directional valve 82 connects said service line 100 to side motion assist cylinder 80, in applications where it is used.

While the pneumatic system just described represents a preferred embodiment of the means to energize the apparatus of the invention, it is possible to design a hydraulic system having somewhat the same configuration as equipment group 30 in FIG. 1, this hydraulic system further comprising pressure control and surge cushioning, so that it could basically perform the functions described in relation to the said pneumatic system. It is felt, however, that the use of hydraulics would not permit the same flexibility and speed of response as can be expected of a pneumatic arrangement.

Similarly, vertical levelling cylinder 66 could be replaced by such other elastic element as, for instance, a helicoidal compression spring, but to the detriment of operating characteristics such as maintaining a constant value of the levelling force.

Although the invention has been described above with one specific form, it will be evident to a person skilled in the art that it may be modified and refined in various ways. Some modifications from the preferred embodiment of the invention have been suggested in the course of the description, either as an option by choice or to suit some particular condition in an existing debarking installation. It is therefore wished to have it understood that the present invention should not be limited in scope, except by the terms of the following claims.

I claim:

1. A flexible mounting system for log debarking equipment such as ring-type log debarking units and log guiding units associated with said log debarking units, each said unit having a separate frame structure, said system comprising:
   support means mounted to a stationary base; and
   oscillating means connecting said support means to said frame structure allowing said frame structure to float freely with respect to said stationary base upon impact from incoming logs and as a result of off-centering pressures generated by logs being processed.

2. A system as defined in claim 1, wherein said oscillating means consist of freely oscillating links supporting one side of said frame structure.

3. A system as defined in claim 2, wherein said links are connected to said support means and said frame structure through rotatable joint means.

4. A system as defined in claim 1, wherein said oscillating means include, on an opposite side of said frame structure, pressure actuated supporting and levelling means.

5. A system as defined in claim 4, wherein said pressure actuated supporting and levelling means include a first cylinder having one end connected to said support means mounted to a stationary base and an opposite end connected to said frame structure; said first cylinder acting as a weight supporting means.

6. A system as defined in claim 5, said first cylinder having, at said one end thereof and at said opposite end thereof, rotatable joint means allowing angular orientation in all directions.

7. A system as defined in claim 4, wherein said pressure actuated supporting and levelling means include a second cylinder having, at one one end thereof, spherical joint means and, at an opposite end thereof, an hemispherical rest piece received in a conical seat attached to said frame structure; said second cylinder acting as a levelling means when in a fully extended position.

8. A system as defined in claim 7, wherein said hemispherical rest piece includes a guide rod protruding through an opening in said conical seat for orienting said second cylinder.

9. A system as defined in claim 5, comprising pressure controlling means associated with said first cylinder so as to maintain about 90% of the weight supported thereon.

10. A system as defined in claim 7, comprising pressure controlling means associated with said second cylinder to cause contact of said hemispherical rest piece with said conical seat at a level ensuring vertical centering of said frame structure.

11. A system as defined in claim 3, further comprising auxiliary means mounted to said support means and to said one side of said frame structure to assist extreme lateral movements of said unit.

12. A system as defined in claim 11, wherein said auxiliary means consist of a double acting cylinder and signal receiving means to actuate said cylinder.

13. A system as defined in claim 12, wherein signals are received by a solenoid actuated valve from a pair of sensing switch means actuated by a follower mounted to said frame structure.

14. A system as defined in claim 9, wherein said pressure controlling means are pneumatic.

15. A system as defined in claim 10, wherein said pressure controlling means are pneumatic.

16. A flexible mounting system for log debarking equipment having ring-type log debarking units, each said unit having a separate frame structure, said system comprising:
   support means mounted to a stationary base; and
   oscillating means connecting said support means to said frame structure allowing said frame structure to float freely with respect to said stationary base upon impact from incoming logs and as a result of off-centering pressures generated by logs being processed.

* * * * *